(12) United States Patent
Dedic et al.

(10) Patent No.: US 9,201,813 B2
(45) Date of Patent: Dec. 1, 2015

(54) SIGNAL DISTRIBUTION CIRCUITRY

(71) Applicant: SOCIONEXT INC., Yokohama-shi, Kanagawa (JP)

(72) Inventors: Ian Juso Dedic, Middlesex (GB); Gavin Lambertus Allen, Western Australia (AU)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/025,313

(22) Filed: Sep. 12, 2013

(65) Prior Publication Data

US 2015/0070077 A1    Mar. 12, 2015

(51) Int. Cl.
  *H03K 17/687* (2006.01)
  *G06F 13/00* (2006.01)
  *G06F 1/10* (2006.01)
(52) U.S. Cl.
  CPC . *G06F 13/00* (2013.01); *G06F 1/10* (2013.01)
(58) Field of Classification Search
  CPC .... H03K 19/02; H03K 17/063; H03K 17/165
  USPC .................................................. 327/291, 296
  IPC ........................................... H03K 5/131, 5/135
  See application file for complete search history.

(56) References Cited

U.S. PATENT DOCUMENTS 5,371,423 A * 12/1994 Berthold et al. ................ 326/57
2011/0037511 A1 * 2/2011 Tokumaru et al. ............ 327/427

FOREIGN PATENT DOCUMENTS

| EP | 1 202 458 B1 | 5/2006 |
| EP | 1 292 035 B1 | 10/2006 |
| EP | 2 019 486 A1 | 1/2009 |
| EP | 2 019 490 A1 | 1/2009 |
| EP | 2 009 795 B1 | 6/2010 |
| EP | 2 019 427 B1 | 9/2010 |
| EP | 2 023 487 B1 | 9/2010 |
| EP | 2 023 489 B1 | 2/2011 |
| EP | 2 211 468 B1 | 7/2011 |
| EP | 2 019 487 B1 | 5/2013 |
| GB | 2 373 854 B | 2/2005 |
| JP | 2009005338 A * | 1/2009 |
| WO | WO 2009041010 A1 * | 4/2009 |

* cited by examiner

*Primary Examiner* — Sibin Chen
*Assistant Examiner* — Metasebia Retebo
(74) *Attorney, Agent, or Firm* — Arent Fox LLP (57) ABSTRACT

Signal distribution circuitry for use in an integrated circuit, the signal distribution circuitry comprising: first and second output nodes, for connection to respective output signal lines; first and second supply nodes for connection to respective high and low voltage sources; and switching circuitry connected to the first and second output nodes and the first and second supply nodes and operable based on an input signal to conductively connect the first and second output nodes either to the first and second supply nodes, respectively, in a first state when the input signal has a first value, or to each other, in a second state when the input signal has a second value different from the first value, so as to transmit output signals dependent on the input signal via such output signal lines.

19 Claims, 4 Drawing Sheets

SIGNAL DISTRIBUTION CIRCUITRY

FIELD OF THE INVENTION

The present invention relates to circuitry for signal distribution, for example for transmission of signals such as clock signals along transmission/signal lines in circuitry such as integrated circuitry. In particular, the invention relates to circuitry for transmission of complementary or differential/inverse signals, i.e. where one signal is the inverse of the other.

One example application of the circuitry disclosed herein is for transmission of clock signals between functional units in both DAC (Digital-to-Analogue) and ADC (Analogue-to-Digital) circuitry, which may be implemented on an IC chip.

BACKGROUND OF THE INVENTION

High-speed DAC and ADC circuitry of the present applicant is typically characterised in that it is necessary to transmit (distribute) many very-fast clock signals over a relatively long distance, and then receive and employ those clock signals.

Figure 1:
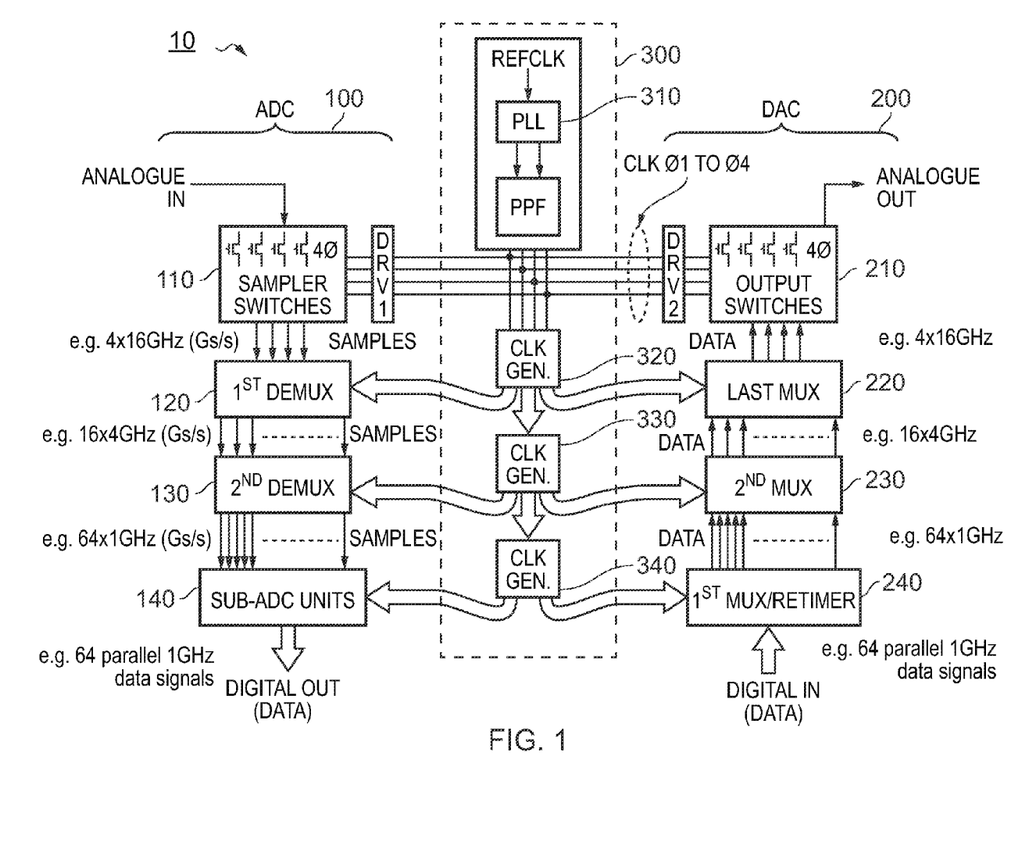
FIG. 1, as described hereinabove, is a schematic diagram showing parts of combined DAC and ADC circuitry, as an example of circuitry in which the present invention may be employed.

FIG. 1 is a schematic diagram showing parts of combined DAC and ADC circuitry 10, as an example of circuitry in which the present invention may be employed. Circuitry 10 comprises ADC circuitry 100 shown on the left-hand side, DAC circuitry 200 shown on the right-hand side, and clock generation and distribution circuitry 300 shown in the middle.

DAC circuitry 200 comprises a switching circuit 210, which comprises clock-controlled circuitry and the data-controlled circuitry. Switching circuit 210 is operable based on input data and clock signals to output an analogue signal representative of the input data.

As a running example, a desired DAC sample rate of 64 Gs/s is assumed, with time-interleaved data signals DATA 1 to DATA 4 (corresponding to the four input data signals shown) input to the switching circuit 210 being 16 GHz (i.e. time-interleaved) data signals. The four input clock signals CLK ϕ1 to CLK ϕ4 are assumed to be four time-interleaved 16 GHz clock signals, which are substantially sinusoidal (raised-cosine signals).

Three stages of multiplexing/retiming 220, 230 and 240 are also shown by way of example, in order to input at the first multiplexed/retiming circuit 240 a parallel set of 64 1 GHz data signals when retiming is carried out (or a parallel set of 128 500 MHz signals, when multiplexing is carried out), and output those as a parallel set of 64 1 GHz data signals to the second multiplexer 230, which in turn outputs 16 4 GHz signals to the third and last multiplexer 220, which in turn outputs the time-interleaved data signals DATA 1 to DATA 4 as 4 16 GHz signals as above.

The data signals may be differential data signals, in which case circuitry 210, 220, 230 and 240 may also be differential circuitry.

The switching circuit 210 is representative of a single segment or "slice" in the overall DAC 200. Thus, any coding (e.g. thermometer-coding) of an ultimate input digital signal is assumed to have occurred upstream of the digital signals input in FIG. 1, such that those input digital signals input are only those intended for the segment or slice shown.

The overall DAC 200 would have further slices or segments, each with their own stages of multiplexing/retiming 220, 230 and 240. Of course, the clock generation and distribution circuitry 300 may be shared (at least in part) between the segments (or separately provided, at least in part).

The analogue outputs of the various slices or segments may be combined to create a single analogue output of the overall DAC. For example, seven segments could be provided to produce the outputs for the 3 MSBs of an 8-bit DAC (with thermometer-encoding), and five segments (in which their outputs are binary weighted) could be provided to produce the outputs for the 5 LSBs. Other variations would of course be possible. For example, an impedance ladder could be employed, as disclosed in EP-A1-2019490.

Clock generation and distribution circuitry 300 comprises a clock generator 310 configured to generate the time-interleaved clock signals CLK ϕ1 to CLK ϕ4 and supply them to the switching circuit 210. Further, shown are three stages of clock generation 320, 330, 340, in order to take the input clock signals CLK ϕ1 to CLK ϕ4 and generate in turn the clock signals (4 GHz and 1 GHz) required by the three stages of multiplexing/retiming 220, 230, 240, as indicated in FIG. 1. Although the clock signals CLK ϕ1 CLK ϕ4 generated by clock generator 310 are sinusoidal, the clock signals generated by the three stages of clock generation 320, 330, 340 need not be, and may be switched-logic signals.

In a similar manner, the ADC circuitry 100 comprises sampler circuitry 110. Sampler circuitry 110 is operable based on input clock signals CLK ϕ1 to CLK ϕ4 and an input analogue current signal to output by current steering four time-interleaved streams of current pulses representative of the input signal. Again, either single-ended or differential signals could be used.

A similar running example is employed here, i.e. a desired ADC sample rate of 64 Gs/s, and with 2-stages of demultiplexing shown as 120 and 130, each performing 1:4 demultiplexing, and with sub-ADC units 140. The sampling circuitry is configured to take samples from the analogue input at the overall 64 Gs/s sample rate by current steering in current mode, and to output 4 streams (single-ended or differential) each at 16 Gs/s (which may be expressed herein as 16 GHz), with the first demultiplexing stage 120 outputting 16 4 Gs/s signals, and with the second demultiplexing stage 130 outputting 64 1 Gs/s signals.

The same clock generation and distribution circuitry 300 accordingly provides its clock signals to the ADC circuitry 100, as well as to the DAC circuitry 200. In particular, looking at FIG. 1 and working downwards from the sampler circuitry 110 and switching circuitry 210, in both the DAC and ADC circuitry the signals in successive stages are 4 16 GHz signals, then 16 4 GHz signals, and then 64 1 GHz signals.

For a more detailed understanding of the circuitry of FIG. 1, reference may be made to EP-A1-2211468 which discloses ADC circuitry in line with ADC circuitry 100.

However, the important point to note is that the FIG. 1 circuitry comprises a large number of very fast dock signals, for example including the 16 GHz signals CLK ϕ1 to CLK ϕ4 and of 4 GHz and 1 GHz signals.

Such signals need to be distributed from a PLL (phase lock loop) or other clock signal generator (see clock generator 310) where they are generated to the sampler circuitry 110 and switching circuitry 210. Additionally, many fast clock signals (e.g. 4 GHz and 1 GHz) are required by the DEMUX (demultiplexers) 120, 130 and sub-ADC units 140 in the ADC circuitry 100 and the MUX (multiplexers or retimers) 220, 230, 240 in the DAC circuitry 200. Again, these clock signals need to be distributed to the necessary circuitry elements (e.g. transistors thereof) via transmission lines from the clock generation and distribution circuitry 300 where they are generated.

A problem is that the signal transmission lines (tracking, in integrated circuitry e.g. on an IC chip) have inherent parasitic capacitance, and that the transmission of such a large number of very fast clock signals (clocks) over a long distance leads to power consumption issues.

For example, it is typically unusual to have so many high-speed clocks driving so many circuits; normally if there are many circuits (e.g. in a DSP core) there are few clocks, and if there are many clocks (e.g. in RF circuits) they each go to only a small number of places and are distributed over a relatively small distance. The circuitry 10 of FIG. 1 is effectively a worst-case combination in which very high-speed ADCs and DACs rely on interleaving or multiplexing the operations of many lower-speed (but nevertheless fast) circuits, and in which there is thus the requirement to distribute a large number of very fast clock signals to many functional elements.

For example, it may be considered that:

Power is proportional to $C \cdot V^2 \cdot F \cdot N$ where:

C=parasitic capacitance of tracking used to distribute clock signals

V=peak-to-peak voltage of the clock signals

F=frequency of the clock signals

N=the number of transmission lines

Essentially, C, F and N are large for the circuitry of FIG. 1, and it is difficult to avoid that in such circuitry. Also, the voltage V has a squared effect as above.

Figure 2A:
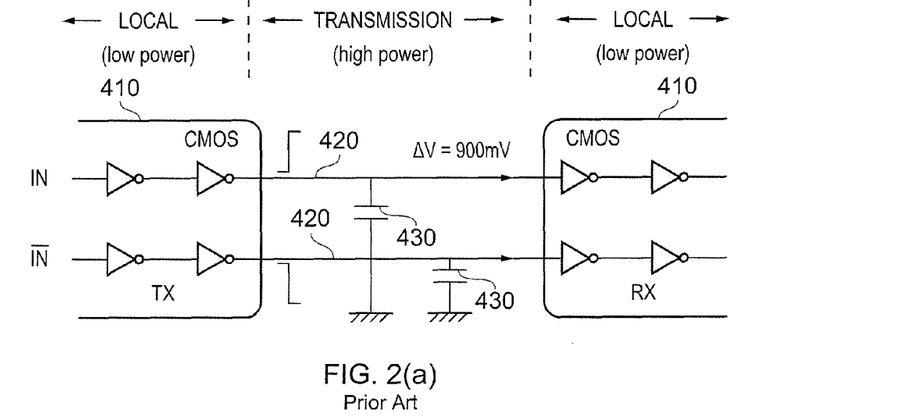
FIGS. 2(a) and 2(b), as described hereinabove, present first and second conventional methods of transmitting a pair of input differential (inverse or complementary) clock signals.

FIG. 2(a) presents a first conventional method of transmitting a pair of input differential (inverse or complementary) clock signals, here shown generically as IN and /IN. As shown, CMOS buffer circuitry 410 is provided at both the transmitting (TX) and receiving (RX) sides, where each comprises a pair of series-connected CMOS buffers (inverters) per input signal, or a pair of differential CMOS buffers shared by the input signals.

The two sets of buffer circuitry 410 are connected via a pair of transmission lines 420 as shown, an as to carry buffered differential signals between them. The transmission lines have their parasitic capacitances 430 explicitly shown.

The CMOS buffer circuitry 410 comprising CMOS buffers may itself be considered relatively low power (as is well known), however the voltage swing on the transmission lines 420 over the indicated parasitic capacitances 430 (e.g. ΔV=900 mV) is relatively high leading to high power consumption over the transmission lines 420 themselves. This "local" low-power consumption, hut high-power consumption in transmission, is indicated in FIG. 2(a).

Figure 2B:
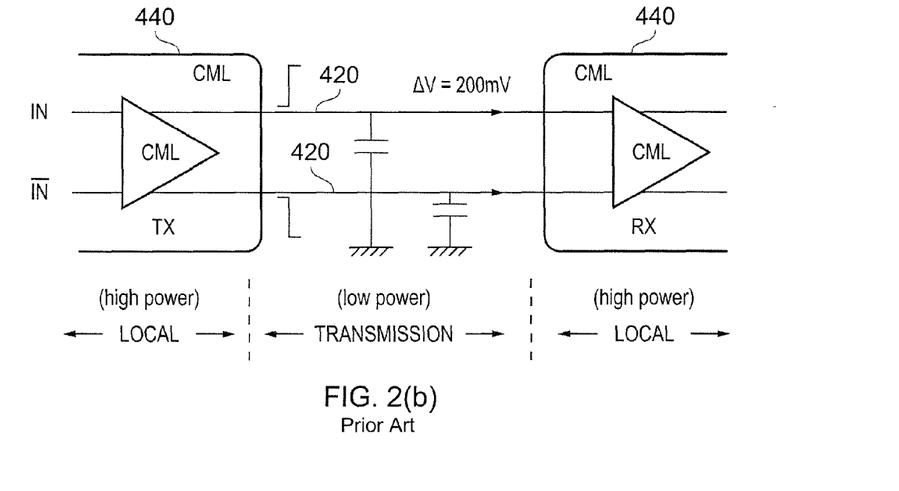

FIG. 2(b) presents a second conventional method of transmitting a pair of differential (inverse or complementary) clock signals, here again shown generically as IN and /IN, using Common Mode Logic (CML) buffer circuitry 440 at both the transmitting and receiving sides. The two sets of CML buffer circuitry 440 are similarly connected via a pair of transmission lines 420 as shown, so as to carry buffered differential signals between them. The transmission lines have their parasitic capacitances 430 explicitly shown.

The advantage of the CML buffer circuitry 440 is reduced voltage swing (e.g. ΔV=200 mV) over the transmission lines 420, however there is relatively high power consumption in the CML buffer circuitry 440, because with e.g. 900 mV input signals, and with $V_{OUT}$=200 mV, there is 700 mV lost in the CML buffers. This "local" high-power consumption, but low-power consumption in transmission, is indicated in FIG. 2(b).

Thus, the CMOS approach of FIG. 2(a) may be described as having low local power consumption and high power consumption in transmission, whereas the CML approach of FIG. 2(b) has high local power consumption and low power consumption in transmission. Unfortunately, both approaches lead to high overall power consumption if deployed in for example the circuitry 10 of FIG. 1, given the sheer number of clock signals to be distributed, and the large distance (i.e. large parasitic capacitance) over which they need be distributed.

It is desirable to solve some or all of the above problems.

SUMMARY OF THE INVENTION

Aspects of the present invention are defined by the independent claims appended hereto. Specific embodiments are defined in the dependent claims.

According to a first aspect of the present invention, there is provided signal distribution circuitry, comprising: first and second output nodes, for connection to respective output signal lines; first and second supply nodes for connection to respective high and low voltage/power sources; and switching circuitry connected to the first and second output nodes and the first and second supply nodes and operable based on an input signal to conductively connect the first and second output nodes either to the first and second supply nodes, respectively, in a first state when the input signal has a first value, or to each other, in a second state when the input signal has a second value different from the first value, so as to transmit output signals dependent on the input signal via such output signal lines.

Such circuitry may be for use in an integrated circuit, and be implemented as integrated circuitry. Such circuitry may be implemented as part of digital-to-analogue converter circuitry and/or analogue-to-digital converter circuitry.

Such circuitry is considered advantageous, since it reduces the voltage swing over complementary output signals (transmitted over such output signal lines) as compared to the swing experience in conventional circuitry as in FIG. 2(a). For example, it may be expected (in such conventional circuitry) that the output signals both fluctuate over the full range between the high and low power sources. In contrast, in embodiments of the present invention both output signals may fluctuate over a range less than the full range between the high and low power sources, for example each over half that range. This reduction in voltage fluctuation of each of the output signals leads to lower power consumption in transmission of those output signals over those output signal lines.

The first and second states may be mutually exclusive, such that it is not possible to be in both states simultaneously. Preferably, the input signal causes the circuitry to switch or alternate between the two states. The first and second states may be effectively the only states, the circuitry being either in one of those states or moving between those states.

The high voltage source may be a digital or supply voltage/power source ($V_{DD}$ or $V_{SS}$) for the circuitry, and the low voltage source may be a ground voltage/power source (GND) for the circuitry.

The switching circuitry may comprise a first switch unit connected between the first output node and the first supply node, a second switch unit connected between the first and second output nodes, and a third switch unit connected between the second output node and the second supply node. In the first state, the first and third switch units may be conductive and the second switch unit may be non-conductive. In the second state, the second switch unit may be conductive and the first and third switch units may be non-conductive.

A switch may be conductive in the sense that it connects or keeps connected together the relevant nodes (which it is connected between), i.e. makes a low resistance connection between them. A switch may be non-conductive in the sense that it disconnects or keeps disconnected the relevant nodes (which it is connected between), i.e. makes a very high (ideally infinite) resistance connection between them. The low resistance may be (or be similar to, or in the order of) the on-resistance of a field-effect transistor (which is hard on, e.g. saturated). The high resistance may be (or be similar to, or in the order of) the off-resistance of a field-effect transistor.

The switch units may comprise transistors, such as field-effect transistors. The switch units may consist only of such field-effect transistors.

The first and third switch units may each comprise (e.g. only) a single transistor, and wherein the second switch unit may comprise (e.g. only) one or two transistors. For example, the first switch unit may comprise (e.g. only) a PMOS transistor, the second switch unit may comprise (e.g. only) a PMOS transistor and/or an NMOS transistor connected in parallel with one another (or only one of those transistors), and the third switch unit may comprise (e.g. only) an NMOS transistor. The switch units may comprises only these transistors in the sense that only these transistors are in the signal path, i.e. are switched transistors of the switching circuitry. That is, the switching circuitry may comprise no other switched transistors (switched by the input signal), or signal-path transistors.

The input signal may fluctuate between high and low values. For example, the input signal may switch between such values, and be a switched-logic or digital signal. The input signal may be a data or clock signal. One of the first and second values of the input signal may be this high value and the other one of the first and second values of the input signal may be this low value. The output signals may also be switched-logic or digital signals, for example data or clock signals, in line with the input signals.

The input signal may comprise a pair of complementary input signals, one of which is the inverse of the other. Both complementary input signals may fluctuate between such high and low values. The first and second values may be values of one of the pair of complementary signals.

The switching circuitry may be configured such that, in the first state, the output nodes are conductively disconnected from one another, and, in the second state, the output nodes are conductively disconnected from the voltage sources.

The switching circuitry may be configured such that, in the first state, the first and second output nodes have respective high and low voltages defined by the respective high and low voltage sources, and, in the second state, the first and second output nodes have substantially the same intermediate voltage, which is between the high and low voltages. The intermediate voltage may be substantially midway between the high and low voltages.

The signal distribution circuitry may comprise buffer circuitry, such as CMOS buffer circuitry, connected to the first and second output nodes via the signal lines, so as to receive the transmitted output signals and output corresponding buffered signals.

According to a second aspect of the present invention, there is provided signal distribution circuitry, comprising: first and second output nodes, for connection to respective output signal lines; first and second supply nodes for connection to respective high and low voltage sources; a first PMOS transistor connected between the first supply node and the first output node; a second PMOS transistor and/or a first NMOS transistor connected in parallel between the first and second output nodes; and a second NMOS transistor connected between said second output node and said second supply node, wherein gate terminals of (to the extent provided) the first PMOS and NMOS transistors are connected to a first input node of the circuitry to receive a first input signal, and wherein gate terminals of the second PMOS and NMOS transistors are connected to a second input node of the circuitry to receive a second input signal, the first and second input signals being complementary signals.

The input signals may be switched-logic signals, preferably data or clock signals.

Signal distribution circuitry as aforementioned may comprise the voltage sources and/or signal lines. Signal distribution circuitry as aforementioned may be integrated circuitry. The signal lines may be tracks or tracking (e.g. implemented in metal layers) in an integrated circuit such as on an IC chip.

According to a third aspect of the present invention, there is provided a digital-to-analogue converter or an analogue-to-digital converter comprising signal distribution circuitry according to any of the aforementioned aspects of the present invention. The digital-to-analogue converter or analogue-to-digital converter may comprise a plurality of sets of such signal distribution circuitry, e.g. each for receiving as an input signal a clock signal and outputting corresponding clock signals as its output signals.

According to a fourth aspect of the present invention, there is provided an integrated circuit or an IC chip comprising signal distribution circuitry according to either of the aforementioned first and second aspects of the present invention, or a digital-to-analogue converter or an analogue-to-digital converter according to the aforementioned third aspect of the present invention.

Further aspects of the present invention comprise method aspects (a method of distributing signals) corresponding in scope respectively with the aforementioned first and second aspects of the present invention.

Reference will now be made, by way of example, to the accompanying drawings, of which:

DETAILED DESCRIPTION OF THE INVENTION

Figure 3:
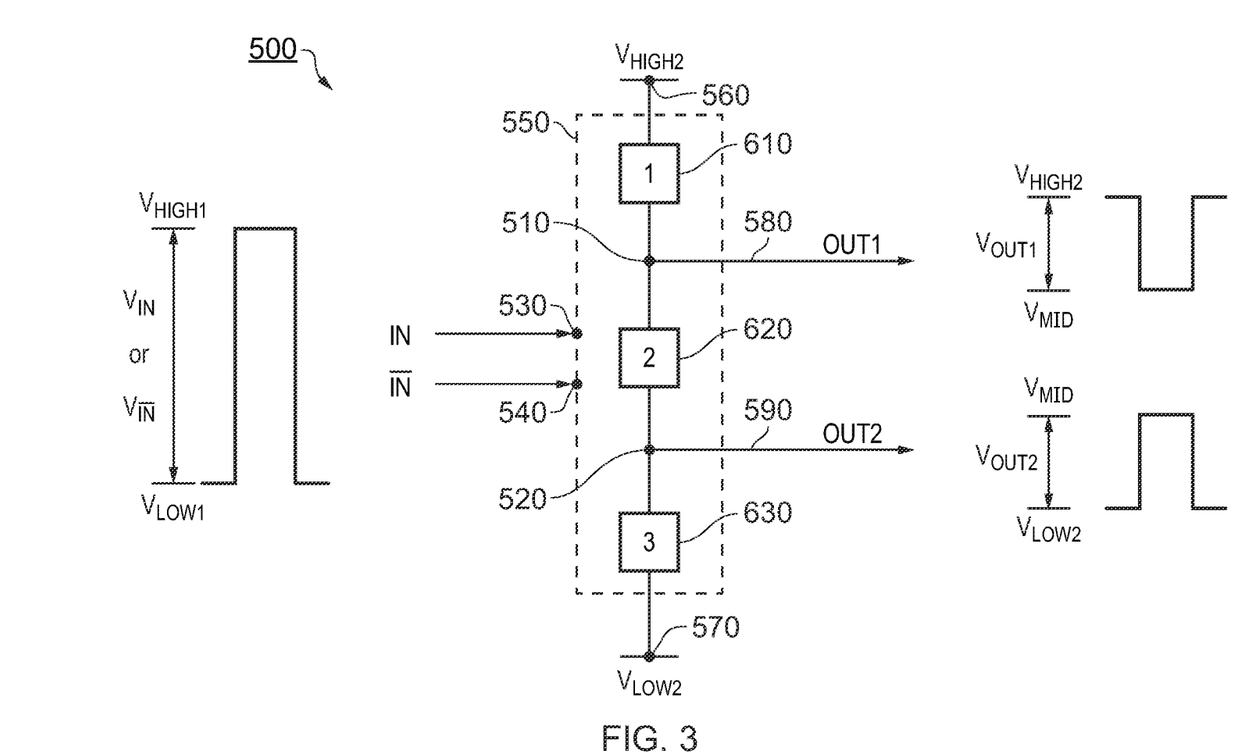
FIG. 3 is a schematic diagram of signal distribution circuitry embodying the present invention.

FIG. 3 is a schematic diagram of signal distribution circuitry 500 embodying the present invention. Signal distribution circuitry 500 comprises first and second output nodes 510, 520, first and second input nodes 530, 540, and switching circuitry 550 connected to the output and input nodes.

The input nodes 530 and 540 are shown receiving input signals IN and /IN and the output nodes are shown outputting output signals OUT1 and OUT2. The switching circuitry 550 is shown connected between first and second supply nodes 560, 570, at which voltage (power) supplies may be connected as indicated and explained below.

The switching circuitry 550, connected to the first and second output nodes 530 and 540, is operable based on an input signal to conductively connect the first and second output nodes 530 and 540 either to respective high and low voltage sources (at nodes 560 and 570), in a first state when the input signal has a first value, or to each other, in a second state when the input signal has a second value different from the first value, so as to transmit output signals OUT1 and OUT2 dependent on the input signal via respective output signal lines 580, 590. The first and second states may be considered complementary states.

The input signal may be either or both of IN and /IN. Thus, although two input nodes 530 and 540 are shown, switching circuitry 550 may comprises a single input node at which a single input signal is received.

Input signals IN and /IN are complementary or differential signals, i.e. where one is the inverse of the other. For example, IN and /IN may be switched-logic signals (e.g. digital signals) where when one of them has its high value (e.g. digital 1) the other has its low value (e.g. digital 0), and vice versa. However, IN and /IN need not be switched-logic signals, and could for example be sinusoidal signals.

Input signals IN and /IN are shown as fluctuating (see $V_{IN}$ and $V_{/IN}$) between high and low voltage levels $V_{HIGH1}$ and $V_{LOW1}$. Switching circuitry 550 is shown as connected between voltage sources which have respective high and low voltage levels $V_{HIGH2}$ and $V_{LOW2}$. In a preferred embodiment. $V_{HIGH1}$ and $W_{LOW1}$ are the same as $V_{HIGH2}$ and $V_{LOW2}$, respectively, however this is not essential. For example, depending on how the switching circuitry 550 is implemented. $V_{HIGH1}$ might be higher or lower than $V_{HIGH2}$. $V_{LOW1}$ and $V_{LOW2}$ might be the same as one another, e.g. being a ground level GND.

Based on the above operation, output signals OUT1 and OUT2 fluctuate over a smaller voltage range than the range between $V_{HIGH2}$ and $V_{LOW2}$. Specifically, output signal OUT1 fluctuates (see $V_{OUT1}$) between $V_{HIGH2}$ and a voltage level $V_{MID}$ which is somewhere between $V_{HIGH2}$ and $V_{LOW2}$. Similarly, output signal OUT2 fluctuates (see $V_{OUT2}$) between $V_{MID}$ and $V_{LOW2}$. The location of $V_{MID}$ between $V_{HIGH2}$ and $V_{LOW2}$ is dependent on the implementation of switching circuitry 550 and mainly the (relative) configuration of the output signal lines 580, 590. Preferably, $V_{MID}$ is halfway between $V_{HIGH2}$ and $V_{LOW2}$.

This operation is in contrast with that of the circuitry of FIG. 2(a) for example, where it would be expected that signals (corresponding to OUT1 and OUT2) output on transmission lines 420 from the left-hand buffer circuitry 410 would both fluctuate over the full range between $V_{DD}$ and GND for that buffer circuitry, i.e. effectively between $V_{HIGH2}$ and $V_{LOW2}$. Thus, since the voltage swing over the two transmission lines may be halved (where $V_{MID}$ is halfway between $V_{HIGH2}$ and $V_{LOW2}$) as compared to in FIG. 2(a), there would be a factor of 4 saving in power consumption in transmission (i.e. over the transmission lines—the output signal lines).

As indicated in FIG. 3, the switching circuitry 550 comprises a first switch unit 610 connected between the first output node 510 and the first supply node 560, a second switch unit 620 connected between the first and second output nodes 510, 520, and a third switch unit 630 connected between the second output node 520 and the second supply node 570.

In the first state, the first and third switch units 610, 630 are conductive and the second switch unit 620 is non-conductive. In the second state, the second switch unit 620 is conductive and the first and third switch units 610, 630 are non-conductive. The first, second and third switch units 610, 620, 630 collectively operate based on the input signals IN and /IN or based on at least one of those input signals.

Figure 4:
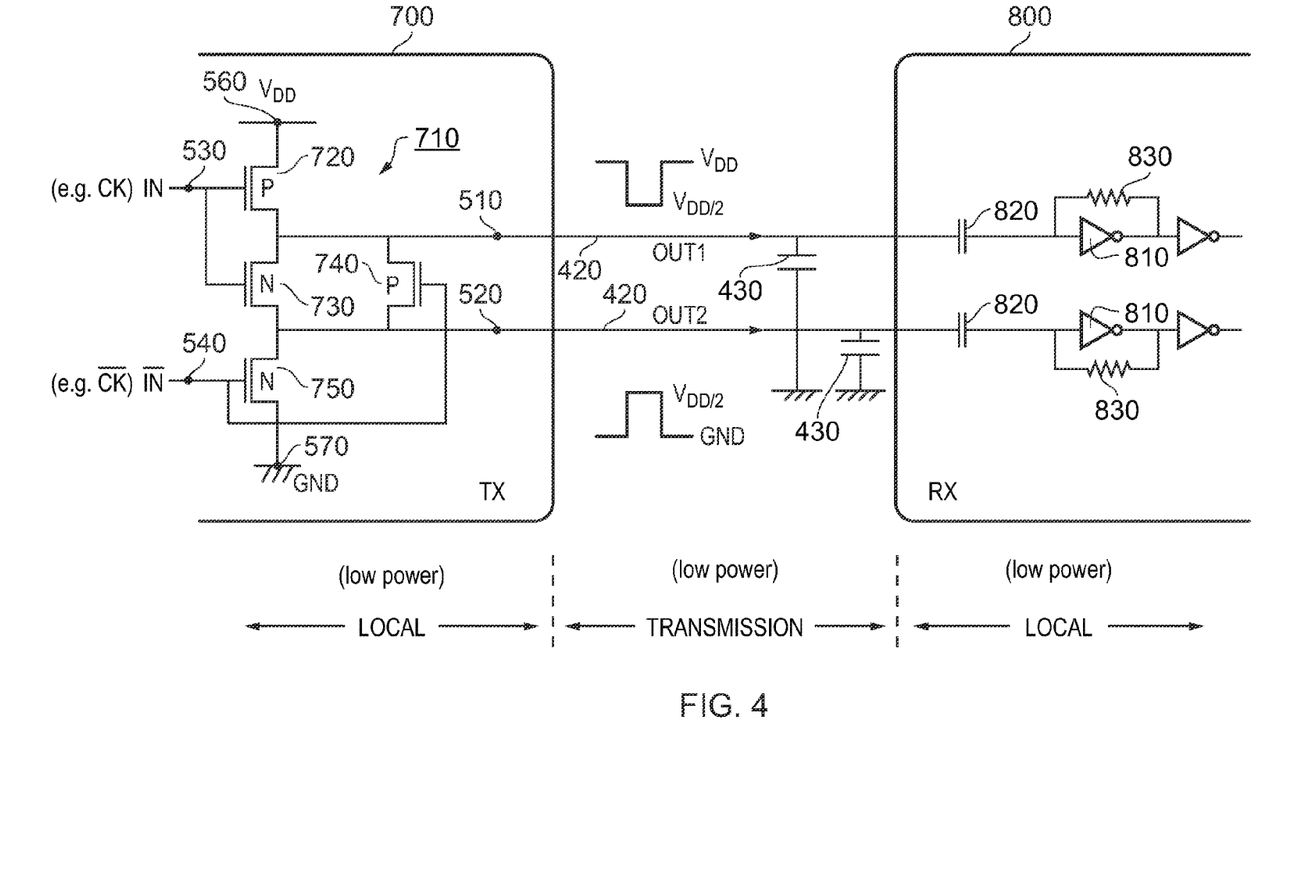
FIG. 4 is a schematic diagram corresponding to FIG. 2(a), but comprising signal distribution circuitry embodying the present invention.

FIG. 4 is a schematic diagram corresponding to FIG. 2(a), but comprising signal distribution circuitry 700 embodying the present invention. Signal distribution circuitry 700 corresponds to signal distribution circuitry 500 of FIG. 3.

Signal distribution circuitry 700 is for transmitting a pair of input differential (inverse or complementary) clock signals CK and /CK, here shown generically as IN and /IN (for consistency with FIGS. 2(a) and 3). Signal distribution circuitry 700 replaces the CMOS buffer circuitry 410 at the transmitting side in FIG. 2(a). Also provided in FIG. 4 is modified CMOS buffer circuitry 800 which replaces the CMOS buffer circuitry 410 at the receiving side in FIG. 2(a).

Similarly to FIG. 2(a), the signal distribution circuitry 700 and the modified CMOS buffer circuitry 800 are connected via a pair of transmission lines 420 as shown, so as to carry buffered differential signals between them. The transmission lines 420 have their parasitic capacitances 430 explicitly shown, as before. The transmission lines 420 correspond to the output signal lines 580 and 590 of FIG. 3.

The signal distribution circuitry 700 comprises first and second output nodes 510, 520, first and second input nodes 530, 540, denoted in the same way as in FIG. 3 for simplicity. The signal distribution circuitry 700 also comprises switching circuitry 710 which corresponds to switching circuitry 550 of FIG. 3, and is thus connected to the output and input nodes. The input nodes 530 and 540 are shown receiving the input signals IN and /IN and the output nodes are shown outputting output signals OUT1 and OUT2, again denoted in the same way as in FIG. 3. The switching circuitry 710 is shown connected between first and second supply nodes 560, 570, denoted as in FIG. 3, at which voltage supplies $V_{DD}$ and GND may be connected as indicated.

The switching circuitry 710 of FIG. 4 operates in substantially the same way as the switching circuitry 550 of FIG. 3, and thus duplicate description is omitted. As indicated in FIG. 4, the switching circuitry 710 comprises a first PMOS transistor 720 connected between the first supply node 560 and the first output node 510, a first NMOS transistor 730 and a second PMOS transistor 740 connected in parallel between the first and second output nodes 510, 520, and a second NMOS transistor 750 connected between the second output node 520 and said second supply node 570.

Gate terminals of the first PMOS and NMOS transistors 720, 730 are connected to the first input node 530 to receive input signal IN as a first input signal, and gate terminals of the second PMOS and NMOS transistors 740, 750 are connected to the second input node 540 to receive input signal /IN as a second input signal, the first and second input signals IN and /IN being complementary signals.

The first PMOS transistor 720 corresponds to the first switch unit 610 of FIG. 3, the first NMOS transistor 730 and the second PMOS transistor 740 together (or individually) correspond to the second switch unit 620 of FIG. 3, and the second NMOS transistor 750 corresponds to the third switch unit 630 of FIG. 3.

In the first state, when IN (or CK) is low, the first PMOS transistor 720 and the second NMOS transistor 750 are on (the first and third switch units 610, 630 are conductive) and the first NMOS transistor 730 and the second PMOS transistor 740 are off (the second switch unit 620 is non-conductive).

In the second state, when IN (or CK) is high, the first NMOS transistor 730 and the second PMOS transistor 740 are on (the second switch unit 620 is conductive) and the first PMOS transistor 720 and the second NMOS transistor 750 are off (the first and third switch units 610, 630 are non-conductive).

The PMOS and NMOS transistors, in particular transistors 720 and 750, and the signal lines 420 are configured such that the output signals OUT1 and OUT2 fluctuate over substantially half of the range $V_{DD}$ GND in this embodiment. Specifically, output signal OUT1 fluctuates between $V_{DD}$ and $V_{DD}/2$. Similarly, output signal OUT2 fluctuates between $V_{DD}/2$ and GND. In FIG. 4, it is assumed that IN and /IN fluctuate between $V_{DD}$ and GND.

The voltage swing at the first and second output nodes 510, 520 is determined by the relative capacitances 430 (including parasitic capacitances of the MOS transistors) on the two output signal lines 420. With PMOS transistor 720 and NMOS transistor 750 both on, the first and second output nodes 510, 520 (and the corresponding lines 420) are charged to VDD and GND respectively. When these transistors turn off and NMOS transistor 730 and PMOS transistor 740 turn on the first and second output nodes 510, 520 (and the corresponding lines 420) are pulled together and the charge is redistributed between them. If the capacitances experienced on the two output signal lines 420 are the same both end up at $V_{MID}=V_{DD}/2$. If the capacitance on the signal line 420 for the first output node 510 is bigger than the capacitance on the signal line 420 for the second output node 520, both end up at $V_{MID}>V_{DD}/2$. If the capacitance on the signal line 420 for the first output node 510 is smaller than the capacitance on the signal line 420 for the second output node 520, both end up at $V_{MID}<V_{DD}/2$. The sizes of the driver transistors affect the $R_{ON}$ of the switches which changes the switching speed.

The receiving side circuitry 800 is closely similar to the receiving-side buffer circuitry 410 in FIG. 2(a), except that the leading CMOS buffers 810 are AC coupled to the transmission lines 410 via capacitors 820, and the leading CMOS buffers 810 have their inputs and outputs coupled via resistors 830, as shown. Such circuitry 800 is one example of suitable circuitry for restoring the signal levels of the received signals OUT1 and OUT2 (by buffering) to produce local signals (output from circuitry 800) which fluctuate over the full range $V_{DD}$ to GND.

It will be appreciated that FIG. 4 presents a circuitry arrangement 700 corresponding to that in FIG. 3 but which deals with the power-consumption problem in a particularly elegant manner. In particular, signal distribution circuitry 700 (specifically, switching circuitry 710) may be considered a low-power high-speed circuit.

For example, in switching circuitry 710, four transistors (2 NMOS, 2 PMOS) are arranged between $V_{DD}$ and ground (GND) and driven by complimentary clock signals CK and /CK (as an example of IN and /IN as indicated. These may be exactly the same transistors as used in the two inverters in a conventional CMOS driver, so no increase in power or area is suffered as compared to a convention CMOS driver e.g. as in buffer circuitry 410.

The effect (with $V_{MID}=V_{DD}/2$) is that the output (e.g. clock) signals OUT1 and OUT2 on transmission fluctuate over $V_{DD}/2$ rather than over $V_{DD}$. As indicated, the clock signal transmitted over the upper line fluctuates between $V_{DD}$ and $V_{DD}/2$, and the clock signal transmitted over the lower line fluctuates between $V_{DD}/2$ and GND. At the receiving side, CMOS buffers similar to those used in FIG. 2(a) restore the levels of the two clock signals.

Input signals IN and IN may be for example sinewave clocks, rather than switched-logic clocks, in theory. However, due to potential duty-cycle distortion and delay errors the application to sinewave signals (e.g. clocks) may be impractical in some embodiments.

Again, looking at FIG. 4, since the voltage swing over the two transmission lines 420 is halved as compared to in FIG. 2(a), there is a factor of 4 saving in power consumption. Further, the number of transistors and their size used in the transmitting side (switching circuitry 710) can be the same as for the two inverters in a conventional CMOS driver leading to low power consumption on transmission. Put simply, the power to drive the buffer is the same as for the CMOS case, but the output power is reduced 4× (cf. $CV^2$ power). Moreover, the receiving side circuitry is closely similar to that in FIG. 2(a) leading also to low power consumption.

As such, the circuitry of FIG. 4 enables significant power saving in relation to clock signal distribution. The proposed circuit is a very simple way of obtaining a large reduction in power compared to full-swing CMOS clocks, with very small additional cost in power and area and delay.

It will be appreciated that numerous modifications may be made to the circuitry of FIG. 4 whilst providing generally the same functionality in line with FIG. 3. For example, each of the PMOS and NMOS transistors may be connected in parallel with other transistors of the same channel type and controlled by the same signals. As another example, one of the transistors connected between the output nodes may be omitted. As another example, if suitable gate drive signals were available, all the transistors in the driver 710 could be NMOS to get the highest possible speed since NMOS transistors have more drive current (lower $R_{ON}$) than PMOS transistors of the same size (same capacitance).

It will be appreciated that the invention may be considered to relate to low-power half-$V_{DD}$-swing differential clock circuits, which may be useful within high-speed analogue-to-digital converters or digital-to-analogue converters. Circuitry of the present invention may from part of an analogue-to-digital converter or a digital-to-analogue converter. Circuitry of the present invention may be implemented as integrated circuitry, for example on an IC chip. The present invention extends to integrated circuitry and IC chips as mentioned above, circuit boards comprising such IC chips, and communication networks (for example, internet fiber-optic networks and wireless networks) and network equipment of such networks, comprising such circuit boards.

The present invention may be embodied in many other different forms, within the spirit and scope of the appended claims.

The invention claimed is:

1. Signal distribution circuitry for use in an integrated circuit, the signal distribution circuitry comprising:
   first and second output nodes, for connection to respective output signal lines;
   first and second supply nodes for connection to respective high and low voltage sources; and
   switching circuitry connected to the first and second output nodes and the first and second supply nodes and operable based on an input signal to conductively connect the first and second output nodes either to the first and second supply nodes, respectively, in a first state when the input signal has a first value, or to each other, in a second state when the input signal has a second value different from the first value, so as to transmit output signals dependent on the input signal via such output signal lines,
   wherein the switching circuitry is configured such that:
   in said first state, the first and second output nodes have respective high and low voltages defined by the respective high and low voltage sources;
   in said second state, the first and second output nodes have substantially the same intermediate voltage, which is between the high and low voltages; and
   the first and second output nodes are held at said intermediate voltage while the input signal is at said second value.

2. Signal distribution circuitry as claimed in claim 1, wherein:

the switching circuitry comprises a first switch unit connected between the first output node and the first supply node, a second switch unit connected between the first and second output nodes, and a third switch unit connected between the second output node and the second supply node;

in said first state, the first and third switch units are conductive and the second switch unit is non-conductive; and in said second state, the second switch unit is conductive and the first and third switch units are non-conductive.

3. Signal distribution circuitry as claimed in claim 2, wherein said switch units comprise transistors, such as field-effect transistors.

4. Signal distribution circuitry as claimed in claim 2, wherein said first and third switch units each comprise only a single transistor, and wherein said second switch unit comprises only one or two transistors.

5. Signal distribution circuitry as claimed in claim 2, wherein:
said first switch unit comprises a PMOS transistor;
said second switch unit comprises a PMOS transistor and an NMOS transistor connected in parallel with one another; and
said third switch unit comprises an NMOS transistor.

6. Signal distribution circuitry as claimed in claim 1, wherein said input signal fluctuates between high and low values, and wherein one of said first and second values is said high value and the other one of said first and second values is said low value.

7. Signal distribution circuitry as claimed in claim 6, wherein:
the input signal comprises a pair of complementary input signals, one of which is the inverse of the other;
said complementary input signals fluctuate between said high and low values; and
said first and second values are values of one of the pair of complementary signals.

8. Signal distribution circuitry as claimed in claim 1, wherein the switching circuitry is configured such that:
in said first state, the output nodes are conductively disconnected from one another; and
in said second state, the output nodes are conductively disconnected from the voltage sources.

9. Signal distribution circuitry as claimed in claim 1, wherein the intermediate voltage is substantially midway between the high and low voltages.

10. Signal distribution circuitry as claimed in claim 1, wherein the input signal is a switched-logic or digital signal.

11. Signal distribution circuitry as claimed in claim 1, wherein the input signal is a data or clock signal.

12. Signal distribution circuitry as claimed in claim 1, comprising buffer circuitry, such as CMOS buffer circuitry, connected to said first and second output nodes via said output signal lines, so as to receive the transmitted output signals and output corresponding buffered signals based thereon.

13. Signal distribution circuitry, comprising:
first and second output nodes, for connection to respective output signal lines;
first and second supply nodes for connection to respective high and low voltage sources;
a first PMOS transistor connected between the first supply node and the first output node;
a second PMOS transistor and a first NMOS transistor connected in parallel between the first and second output nodes; and
a second NMOS transistor connected between said second output node and said second supply node,
wherein gate terminals of the first PMOS and NMOS transistors are connected to a first input node of the circuitry to receive a first input signal, and wherein gate terminals of the second PMOS and NMOS transistors are connected to a second input node of the circuitry to receive a second input signal, the first and second input signals being complementary signals,
wherein:
in a first state, when the first and second input signals have first values, the first and second output nodes have respective high and low voltages defined by the respective high and low voltage sources;
in a second state, when the first and second input signals have second values, the first and second output nodes have substantially the same intermediate voltage, which is between the high and low voltages; and
the first and second output nodes are held at said intermediate voltage while the first and second input signals have said second values.

14. Signal distribution circuitry as claimed in claim 13, wherein the input signals are switched-logic or digital signals.

15. Signal distribution circuitry as claimed in claim 13, wherein the input signals are data or clock signals.

16. A digital-to-analogue converter comprising signal distribution circuitry as claimed in claim 1.

17. An integrated circuit comprising signal distribution circuitry as claimed in claim 1.

18. An analogue-to-digital converter comprising signal distribution circuitry as claimed in claim 13.

19. An IC chip comprising signal distribution circuitry as claimed in claim 13.

* * * * *